United States Patent
Heilbrunn

(10) Patent No.: US 10,540,154 B2
(45) Date of Patent: Jan. 21, 2020

(54) SAFE LOADING OF DYNAMIC USER-DEFINED CODE

(71) Applicant: SAP SE, Walldorf (DE)

(72) Inventor: Benjamin Heilbrunn, Potsdam (DE)

(73) Assignee: SAP SE, Walldorf (DE)

( * ) Notice: Subject to any disclaimer, the term of this patent is extended or adjusted under 35 U.S.C. 154(b) by 124 days.

(21) Appl. No.: 15/292,727

(22) Filed: Oct. 13, 2016

(65) Prior Publication Data

US 2018/0107463 A1    Apr. 19, 2018

(51) Int. Cl.
   *G06F 8/41*    (2018.01)

(52) U.S. Cl.
   CPC .................................. *G06F 8/41* (2013.01)

(58) Field of Classification Search
   CPC .................................................. G06F 8/20–78
   See application file for complete search history.

(56) References Cited

U.S. PATENT DOCUMENTS

| | | | |
|---|---|---|---|
| 8,627,279 B2 * | 1/2014 | Fox ........................... | G06F 8/30 717/113 |
| 8,843,886 B2 * | 9/2014 | Fox ........................... | G06F 8/30 717/113 |
| 2004/0044648 A1 * | 3/2004 | Anfindsen ............... | G06Q 10/06 |
| 2011/0055814 A1 * | 3/2011 | Klarer ...................... | G06F 8/443 717/124 |
| 2012/0204143 A1 * | 8/2012 | Fox ........................... | G06F 8/30 717/113 |
| 2012/0304160 A1 * | 11/2012 | Soeder ................... | G06F 9/4486 717/148 |
| 2013/0239087 A1 * | 9/2013 | Fox ........................... | G06F 8/30 717/113 |
| 2016/0094564 A1 * | 3/2016 | Mohandas ............ | H04L 63/145 726/24 |
| 2017/0177868 A1 * | 6/2017 | Hay ....................... | G06F 21/565 |

* cited by examiner

*Primary Examiner* — Bing Zhao
(74) *Attorney, Agent, or Firm* — Sterne, Kessler, Goldstein & Fox P.L.L.C.

(57) ABSTRACT

Disclosed herein are system, method, and computer program product embodiments for dynamically loading user-defined code into a multi-user system. An embodiment operates by receiving an action represented by source code including one or more elements of a programming language from a user of a multi-user system; compiling the source code into compiled code, the compiling further including modifying the action based on a filter including at least one of the one or more elements so that the compiled code represents the modified action; and executing the complied code on the multi-user system.

22 Claims, 6 Drawing Sheets

SAFE LOADING OF DYNAMIC USER-DEFINED CODE

BACKGROUND

Software solutions often allow privileged users to change the behavior of a system during its runtime. In most cases, this variability is achieved by predefined configuration parameters, which can be set to predefined value-ranges, e.g. the maximum number of connections of a hypertext transfer protocol (HTTP) server.

However, in some cases, the mechanism of configuration parameters is too restrictive. Certain systems allow users to introduce arbitrary custom logic in the form of user-defined code during runtime. For example, some multi-tenant systems are highly variable during runtime. Variability can be achieved via a rule engine, in particular, by a user specifying "Event Condition Action" rules to express under which conditions (event+condition) which state changes in the system should apply (action).

On one side, this freedom is desired and necessary in order to give the rule authors the opportunity to formalize arbitrary complex logic. On the other side, this freedom, however, can become a safety concern once users start to insert malicious source code as part of their rules. Malicious rules could, for example, terminate the running server process and thus, take down the service for all other tenants and other applications running at the server as well. Moreover, the rules can illegally access and tamper with resources on the executing machine, such as password files or business data. Finally, undesired operations on the executing process, such as undesired access to memory and objects that allow security critical operations shall be prohibited.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, module, component, method and/or computer program product embodiments, and/or combinations and sub-combinations thereof, for dynamically loading user-defined code into a multi-user system.

Figure 1:
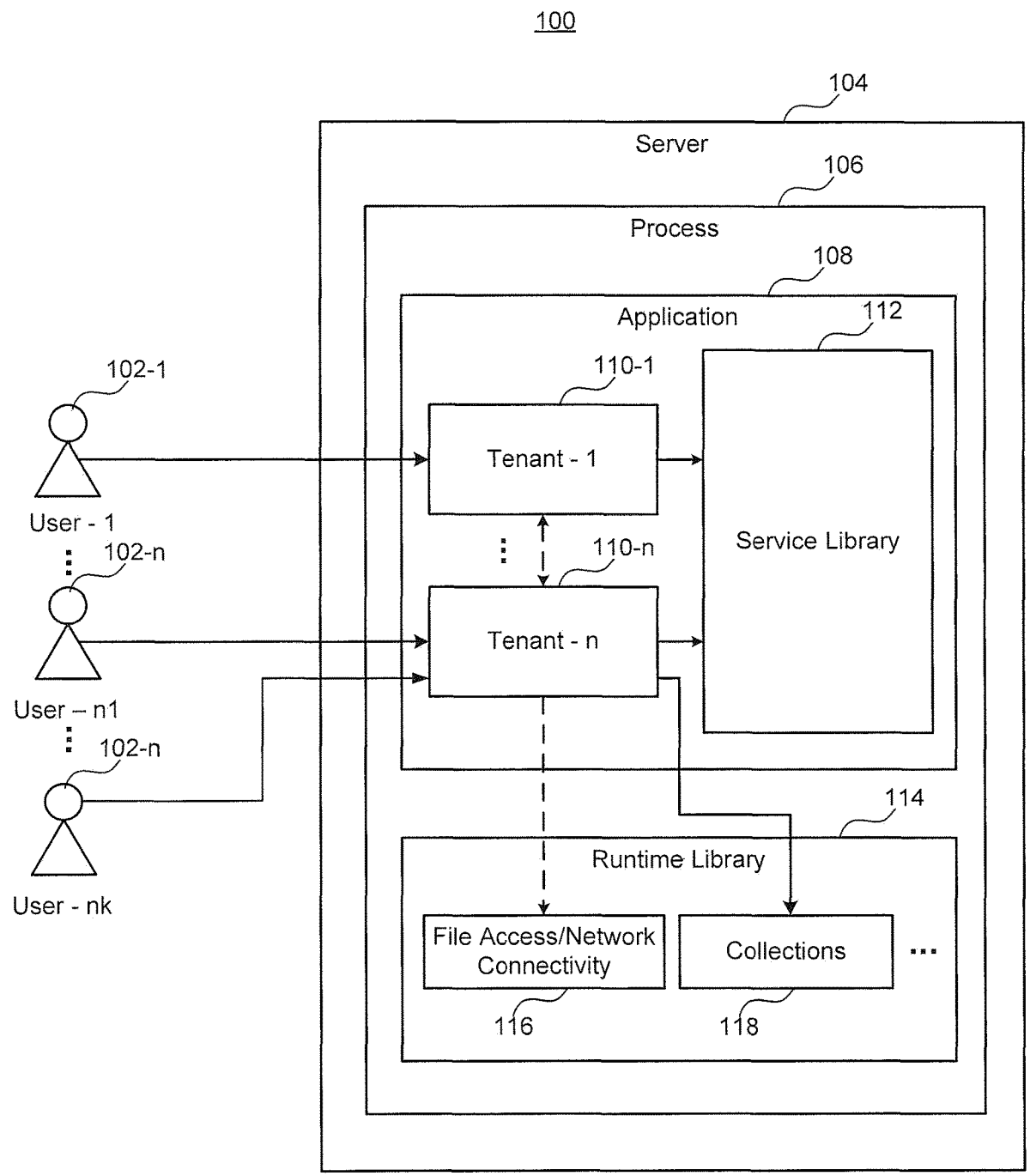
FIG. 1 is a block diagram of a multi-user system, according to some embodiments.

FIG. 1 is a block diagram of a multi-user system 100, according to some embodiments. Multi-user system 100 may be any computer system that allows access by multiple users 102. In some embodiment, multi-user system 100 includes a multi-tenant system in a cloud computing environment in which a single instance of a software application serves multiple users (a.k.a. customers or tenants). For example, a software-as-a-service (SaaS) provider can run one instance of its application on one instance of a database and provide web access to multiple tenants. In such an example scenario, each tenant's data may be isolated and remains invisible to other tenants.

As shown in FIG. 1, multi-user system 100 may allow multiple users 102-1, ..., 102-n to access a server 104 in which one or more processes 106 are running. It is to be appreciated that server 104 may be an application server or a web server, to name just some examples, that is implemented on a single host computer or a computer cluster comprising a set of locally or remotely connected computers. In some embodiments, server 104 may be an application server, and process 106 may be an application server process. One or more software applications 108, such as web applications for cloud service, can be deployed on server 104 and run in process 106.

In this embodiment, multiple users 102 can share the same process 106 via different tenants 110 of each application 108 running in process 106. In other words, in this embodiment, process 106 and application 108 running therein may not be duplicated for each individual user 102. One tenant, e.g., 110-1, may be dedicated to one user, e.g., user-1, and another tenant, e.g., 110-n, may be shared by multiple users, e.g., user-n1 to user-nk. Application 108 may further include a service library 112 that includes software code to define elements (e.g., packages, classes, members, etc.) of programming language(s) used by process 106 via a compiler.

In addition to application 108, a runtime library 114 may run in process 106 as well to provide resources necessary for application 108. Runtime library 114 may include a set of software routines used by a compiler to invoke functions of process 106 by inserting calls to runtime library 114 into compiled code (e.g., executable binary code). In some embodiments, runtime library 114 may include file access/network connectivity 116 and collections 118. It is to be appreciated that runtime library 114 may provide other resources via suitable software routines. In this embodiment, multiple users 102 can share the same runtime library 114 via respective tenant 110 of each application 108 running in process 106. In other words, in this embodiment, resources of process 106 may not be duplicated for each individual user 102.

In some embodiments, each user 102 may be given the ability to customize some parts of application 108 at runtime via user-defined rules (a.k.a., customer logic) represented by user-defined source code of a programming language used by process 106. A user-defined rule may include an action. In some embodiments, a user-defined rule may further include an event and/or a condition. An event may be anything that user 102 does in application 108, such as finishing a lesson in an online learning course. A condition may be any state-variable that is maintained within the working memory of server 104, such as that user 102's email address being provided to application 108. An action may describe what should happen if an event occurred and/or a corresponding condition was met. It is to be appreciated that an event and/or condition are not always necessary to trigger an action. Actions can be expressed as arbitrary code that invokes methods, or read and write internal state of process 106.

With this ability, users 102 can, for example, query and update the persistent storage of server 104 or use a logger to write messages to the server-log. Code Listing 1 below shows an example of a valid and secure user-defined rule: When a player completes a lesson, his/her email address contains "@sap.com," and he/she currently has less than 100 points of type MyPoint, then give the player 10 points of type MyPoint and log a statement indicating that he/she just received the points.

Code Listing 1: Non-limiting example of
a valid and secure user-defined rule

```
when
    Event($playerId:playerId, type='lesson_finished',
    $lessonId:lessonId) from entry-stream stream
    Player(playerId=$playerId, email.contains('@sap.com'))
    eval(queryAPI.getPointsForPlayer('MyPoint', $playerId) < 100)
then
    updateAPI.givePoints('MyPoint', $playerId, 10);
    logger.info("Player " + $playerId +
    " finished a lesson in the system");
```

A valid and secure user-defined rule, such as the example shown in Code Listing 1, can allow users 102 to leverage the expressivity of a programming language to formalize arbitrary complex logic. As shown in FIG. 1, users 102 may load valid and secure user-defined rules via respective tenants 110 to access service library 112 and some parts of runtime library 114, e.g., collections 118 (indicated by the arrows with solid lines).

However in some embodiments, malicious code, as part of user-defined rules, should be dynamically identified at runtime and prohibited from being imported and executed. For example, as shown in FIG. 1, an action intended by one user 102-1 to access data of another user 102-n, and vice versa, may be prohibited (as indicated by the arrows with dashed lines). Similarly, access to file access/network connectivity 116 of runtime library 114 may be prohibited as well (as indicated by the arrow with dashed line). In other examples, malicious rules may terminate process 106, which in turn takes down the services of all other users 102 and other applications running in process 106 as well. Moreover, malicious rules may illegally access and tamper with resources, such as password files or business data. Code Listing 2 below illustrates an example of a malicious user-defined rule. Upon receiving an arbitrary event, it deletes a folder on server 104, starts a browser on a predefined uniform resource locator (URL), deletes the Rule Engine of another user's app, and finally terminates the whole Virtual Machine, which results in unavailability of the services for all other users as well.

Code Listing 2: Non-limiting example
of a malicious user-defined rule

```
when
    $evt : EventObject( ) from entry-point eventstream
then
    try {
        Runtime.getRuntime( ).exec('cmd /C rmdir C:\important /s /q');
        Runtime.getRuntime( ).exec('cmd /C
        start https://www.youtube.com/watch?y=BROWgjuTM0g');
        RuleEngine.getInstance("TenantX", "App1").reset( )
    }
    catch (java.io.IOException e) { }
    System.exit(1);
```

As will be described below in detail, dynamically loading of user-defined code into multi-user system 100 can be implemented to identify and filter malicious code at runtime.

According to some embodiments, the present disclosure can ensure the validity and security of user-defined rules being loaded into multi-user system 100 by any user 102, while not reducing the expressivity of the programming language used by process 106. At the same time, some embodiments are minimally invasive and therefore, highly efficient with regards to execution performance because the user-defined code is checked during compilation time, which results in zero-overhead during execution time.

Figure 2:
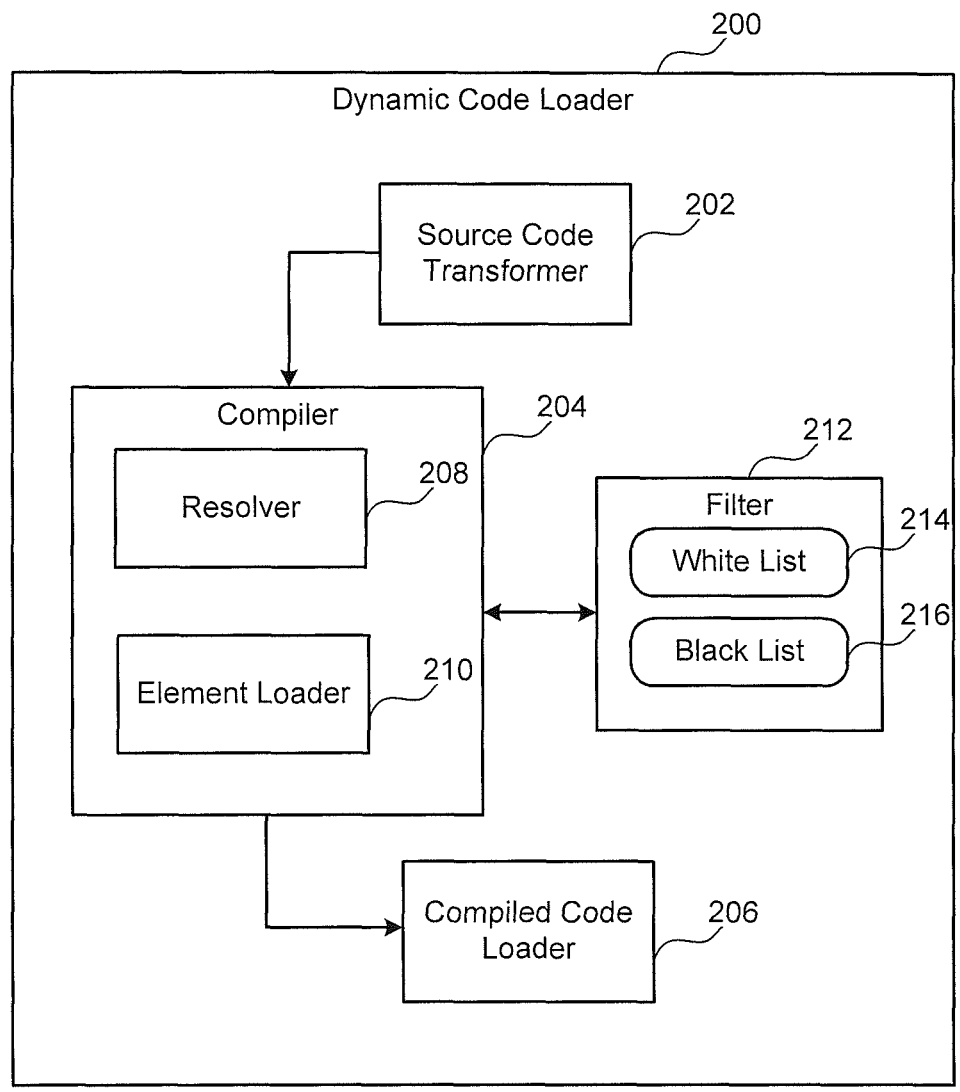
FIG. 2 is a block diagram of a dynamic code loader for dynamically loading user-defined code into a multi-user system, according to some embodiments.

FIG. 2 is a block diagram of a dynamic code loader 200 for dynamically loading user-defined code into multi-user system 100, according to some embodiments. Dynamic code loader 200 may be implemented on server 104 of multi-user system 100 to ensure the validity and security of any user-defined rules loaded by users 102 into process 106 running on server 104. Dynamic code loader 200 can load any user-defined code written any programming languages, such as but not limited to, Java, Python, C++, Javascript, Ruby, C#, C, PHP, Perl, Scala, etc. Dynamic code loader 200 may include a source code transformer 202, a compiler 204, and a compiled code loader 206.

Source code transformer 202 may receive user-defined rules in the form of user-defined source code and pre-process the user-defined source code. For example, source code transformer 202 may transform the rule dialect in pure code of the programming language so that the result is compatible with compiler 204 for the programming language. Compiler 204 may compile the received source code into compiled code (i.e., executable code of the programming language), such as byte code for Java. Compiled code loader 206 may load the compiled code into process 106 so that it can be invoked by any program thread. Once invoked, the loaded compiled code can be executed to perform the corresponding user-defined rules.

In this embodiment, compiler 204 includes a resolver 208 and an element loader 210, and dynamic code loader 200 further includes a filter 212 to ensure that no malicious code can be loaded into multi-user system 100 via any user-defined rules. As described above, a user-defined rule includes at least an action that the author of the rule (e.g., user 102) intends to be performed by multi-user system 100. The action may be represented by source code including one or more elements of a programming language used by process 106. The elements include, for example, packages, classes, and members (e.g., attributes, functions, methods, fields, etc.). For example, the elements of Java include Java packages (e.g., java.lang, java.util, java.math, etc.), Java classes (types), and Java members (e.g., methods and fields). In some embodiments, the elements may be at different levels of a hierarchy, such as parent elements and child elements. For example, a Java package (e.g., java.lang) may include multiple classes (e.g., java.lang.Runtime), and each class may further include multiple methods (e.g., java.lang.Runtime.getAvailableProcessors( )) and/or fields (e.g., Math.PI). In other words, elements of programming languages may be defined at different granularities.

In some embodiments, once the source code is transformed by source code transformer 202 to become compatible with compiler 204, resolver 208 of compiler 204 may resolve each element in the source code from service library 112 and/or libraries of process 106 (e.g., Java SE platform library). For example, for Java, resolver 208 may resolve each class in the source code with its accessible fields and methods based on the type definition of the class. Element loader 210 may load any element resolved by resolver 208 from service library 112 and/or libraries of process 106. For example, resolver 208 may retrieve the type definition of a class from service library 112 so that element loader 210 can access the corresponding fields and methods of the class based on the type definition.

In this embodiment, resolver 208 in conjunction with element loader 210 may modify an action represented by the user-defined code based on filter 212 to ensure the validity and security of the user-defined rule. Filter 212 may include a whitelist 214 and a blacklist 216, each of which includes a list of elements of the programming language. Whitelist 214 may include a set of elements, either at the same level or different levels of the hierarchy, which are allowable to be used; users 102 cannot compile against, and therefore, use any element that is not included in whitelist 214. Whitelisting can be realized by building the environment of available elements only from the listed elements, which means element loader 210 returns only element(s) that are in whitelist 214. Code Listing 3 below shows an example whitelist, which allows users 102 to only make use of: (1) all members of the class com.sap.gamification.AchievementApi, (2) all members of the class java.util.ArrayList, and (3) the methods getRuntime( ) and availableProcessors( ) of the class java.lang.Runtime.

---
Code Listing 3: Non-limiting example whitelist
---
WHITELIST
com.sap.gamification.AchievementApi
java.util.ArrayList
java.lang.Runtime.[getRuntime( ), availableProcessors( )]
---

Blacklist 216 may include a set of elements, either at the same level or different levels of the hierarchy, which are forbidden to be used; users 102 cannot compile against any element which is included in blacklist 216. Blacklisting can be realized by reducing the standard compilation environment by the listed elements, which means element loader 210 returns all resolvable elements except the ones in blacklist 216. Code Listing 4 below shows an example blacklist, which allows users to make use of all available elements, except: (1) the method newInstance( ) of the class java.lang.Class, (2) all members of the class java.net.Socket, and (3) the method exec(String) and the method exit of the class java.lang.Runtime.

---
Code Listing 4: Non-limiting example blacklist
---
BLACKLIST
java.lang.Class.[newInstance( )]
java.net.Socket
java.lang.Runtime.[exec(String), exit]
---

As described above, filter 212, either whitelist 214 or blacklist 216, can include elements at different levels of the hierarchy. In other words, the access control is not limited to the package or class level, but can expand to finer granularities, for example, the method or field level. Whitelist 214, for instance, may include java.lang.Runtime.getAvailableProcessors( )—allowing users 102 to query server 104's number of processors. However, users 102 may be prohibited to access java.lang.Runtme.exec(String), which is defined by the same class type (java.lang.Runtime) but dangerous, because it may create the chance to execute arbitrary commands in the server environment.

In some embodiments, instead of removing the entire element (e.g., the whole class) that is either in blacklist 216 or not in whitelist 214, element loader 210 may modify the definition of an element (e.g., a type definition of a class) before returning it to compiler 204 so as to achieve fine-grained control of user-defined rules. For example, element loader 210 may remove certain fields and/or methods that are either on blacklist 216 or not on whitelist 214 before returning the corresponding class or package to compiler 204. In one example, the fine grained control can be achieved by byte code manipulation tools, such as Javassist or Apache BCEL.

Code Listing 5 below illustrates one example of an algorithm implemented by element loader 210 for modifying user-defined rules based on whitelist 214 and blacklist 216. In this example, element loader 210 first checks each class of user-defined code against blacklist 216. If a class is completely in blacklist 216, then the class is removed and would not be returned. If a class is partially in blacklist 216, i.e., some members of the class are in blacklist 216, then the blacklisted members are removed from the definition of the class. Element loader 210 then checks each class of the user-defined code against whitelist 214. If a class is completely in whitelist 214, then the class is retained and returned to compiler 204. If a class is partially in whitelist 214, i.e., some members of the class are in whitelist 214, then only the whitelisted members are retained in the definition of the class. However, in other embodiments, element loader 210 can be implemented using other code/pseudo code/algorithms.

---
Code Listing 5: Non-limiting example pseudo code
for filtering class loader getResource function
---
```
OperationMode mode = BLACKLIST | WHITELIST;
function ByteCode getResourceAsStream(resourceName) {
    if(isClass(RESOURCE)) {
        ByteCode class = readAsClass(RESOURCE);
        if(mode == BLACKLIST) {
            if(isFullyBlacklisted(name(class)))
                throw new RestrictedTypeException( );
            if(isPatiallyBlacklisted)
                return removeMembers(class,
                    getBlacklistedMembersFor(name(class));
        }
        else if(mode == WHITELIST) {
            if(isFullyWhitelisted(name(class)))
                return class;
            if(isPatiallyBlacklisted)
                return retainOnlyMembers(class,
                    getWhitelistedMembersFor(name(class));
        }
    }
    else return read(RESOURCE);
```
---

In some embodiments, if there is any member in the user-defined code is determined to be insecure by compiler 204, e.g., in blacklist 216 or not in whitelist 214, then the entire user-defined code is rejected by compiler 204 from being compiled and loading into multiple-user system 100. In some embodiments, the determined insecure member(s) are removed by compiler 204 from compilation, but the remaining secure members are retained to generate a partial compiled code if no other elements in the compiled code (either directly or in directly) depend on any of the rejected elements.

In some embodiments, filter 212 may be associated with a privilege level of multi-user system 100. For example, a group of users 102 may be assigned to a higher privilege level than other users 102. Filter 212 associated with the higher privilege level may include whitelist 214 with more elements and/or blacklist 216 with fewer elements. Element loader 210, before loading each element of user-defined code, may first determine the appropriate filter for the user based on the privilege level of the user.

In some embodiments, filter 212 may be preset by an administrator of multi-user system 100. In some embodiments, filter 212 may be dynamically updated based on events occurred in multi-user system 100. For example, a certain method may not be included in the blacklist of the initial filter set by the administrator. During the operation of multi-user system 100, a backdoor caused by the method may be identified, which can in turn trigger the filter to be dynamically updated to include this method in the blacklist to reduce the future risk.

As described above, dynamic code loader 200 may check the validity and security of user-defined code while compiling the code and thus, can achieve minimal invasive. Compilation and element resolution are steps that may have to be performed anyway; no new runtime concepts have to be introduced, and there are no side effects or other undesired consequences for the user caused by dynamic code loader 200. Moreover, dynamic code loader 200 may check the validity and security of user-defined code with zero execution overhead because the logic for ensuring security needs to be executed once.

Figure 3:
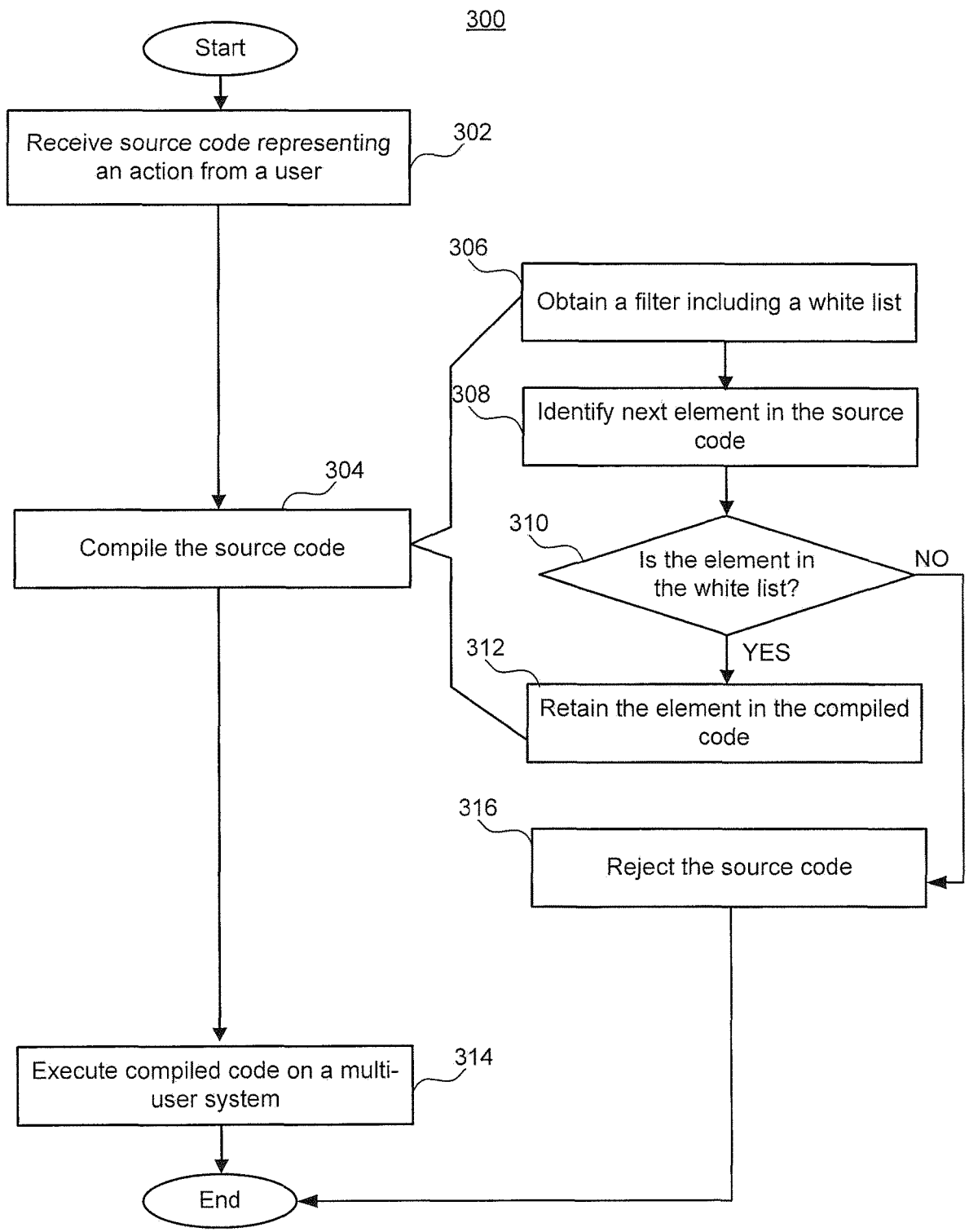
FIG. 3 is a flowchart for a method for dynamically loading user-defined code, according to some embodiments.

FIG. 3 is a flowchart for a method 300 for dynamically loading user-defined code, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1 and 2. However, method 300 is not limited to that example embodiment. In 302, dynamic code loader 200 receives source code representing an action from user 102 of multi-user system 100. The action may be part of a user-defined rule that includes an event and/or a condition. The source code may include one or more elements of a programming language used by process 106 running in multi-user system 100. The elements may be at multiple levels of a hierarchy, such as packages, classes, and members of classes. Users 102 of multi-user system 100 may share the same process or resource.

In 304, compiler 204 of dynamic code loader 200 compiles the received source code into compiled code (i.e., executable code). In compiling the source code, compiler 204 may modify the action based on filter 212 so that the compiled code represents the modified action. Filter 212 includes at least one of the elements in the received source code.

An embodiment of element 304 shall now be described in greater in detail. Specifically, in 306, compiler 204 obtains filter 212 including whitelist 214. Whitelist 214 includes a list of elements of the programming language that are allowable to be used by process 106 of multi-user system 100. In 308, compiler 204 identifies the next element in the received source code. For example, compiler 204 may parse the source code to detect each package, class, and class member. In 310, compiler 204 compares the element to the list of elements in whitelist 214 to determine whether the element is in whitelist 214. If the element is not in whitelist 214, method 300 proceed to 316 to reject the source code from user 102 by compiler 204. As a result, compilation at 304 is aborted, and method 300 ends. If the element is in whitelist 214, then in 312, compiler 204 retains the element in the compiled code. 308, 310, and 312 may be repeated until all the elements in the source code have been checked against whitelist 214 and retained in the complied code. It is to be appreciated that in some embodiments, even if one or more elements are not in whitelist 214, method 300 may reject those particular element(s) and still continue to compile the retained elements that are in whitelist 214 to generate a partial compiled code if no other elements in the compiled code (either directly or in directly) depend on any of the rejected elements.

In 314, server process 106 executes the compiled code. For example, the compiled code may be loaded into the working memory of server process 106 and executed by one or more processors of server process 106 to perform the modified action when the corresponding event occurs and/or the corresponding condition is met. The compiled code is free of any malicious rules. For example, whitelist 214 of filter 212 ensures that the modified action involves only elements that are explicitly allowable by multi-user system 100.

Figure 4:
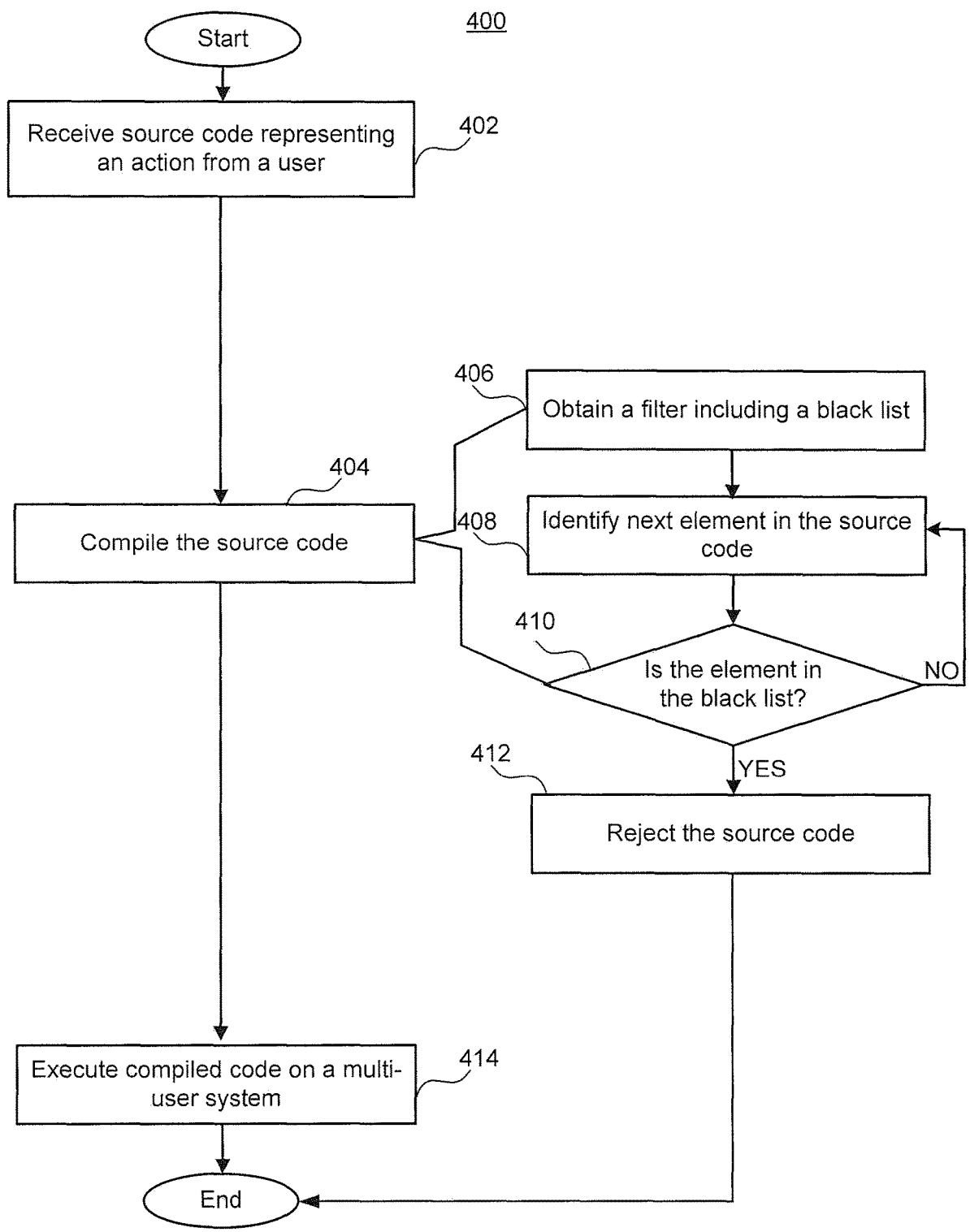
FIG. 4 is a flowchart for another method for dynamically loading user-defined code, according to some embodiments.

FIG. 4 is a flowchart for another method 400 for dynamically loading user-defined code, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 2. However, method 400 is not limited to that example embodiment. In 402, dynamic code loader 200 receives source code representing an action from user 102 of multi-user system 100. The action may be part of a user-defined rule that includes an event and/or a condition. The source code may include one or more elements of a programming language used by process 106 running in multi-user system 100. The elements may be at multiple levels of a hierarchy, such as packages, classes, and members of classes. Users 102 of multi-user system 100 may share the same process or resource.

In 404, compiler 204 of dynamic code loader 200 compiles the received source code into compiled code (i.e., executable code). An embodiment of element 404 is shown as elements 406-412. As shown in this example, in compiling the source code, compiler 204 may modify the action based on filter 212 so that the compiled code represents the modified action. Filter 212 includes at least one of the elements in the received source code.

Specifically, in 406, compiler 204 obtains filter 212 including blacklist 216. Blacklist 216 includes a list of elements of the programming language that are not allowable to be used by process 106 of multi-user system 100. In 408, compiler 204 identifies the next element in the received source code. For example, compiler 204 may parse the source code to detect each package, class, and class member. In 410, compiler 204 compares the element to the list of elements in blacklist 216 to determine whether the element is in blacklist 216. If the element is not in blacklist 216, method 300 returns back to 408 to identify the next element in the source code and determine whether the next element is in blacklist 216. If the element is in blacklist 216, then in 412, compiler 204 rejects the source code from user 102. As a result, compilation at 404 is aborted, and method 400 then ends. 408 and 410 may be repeated until all the elements in the source code have been checked against blacklist 216 and retained in the complied code. It is to be appreciated that in some embodiments, even if one or more elements are in blacklist 216, method 400 may reject those particular element(s) and still continue to compile the retained elements that are not in blacklist 216 to generate a partial compiled code if no other elements in the compiled code (either directly or in directly) depend on any of the rejected elements. It is also to be appreciated that an element (child element) may be part of another element at a higher level in the element hierarchy (parent element) so that removing the child element from the compiled code would not affect the execution of the parent element. For example, one example of blacklist 216 may include certain members of a class, and removing those members from the compiled code would not affect the execution of the class itself. In other words, compiler 204 may change the definition of an element (e.g., a class) during compilation time by removing members of the element that are deemed to be dangerous.

In 414, server process 106 executes the compiled code. For example, the compiled code may be loaded into the working memory of server process 106 and executed by one or more processors of server process 106 to perform the modified action when the corresponding event occurs and/or the corresponding condition is met. The compiled code is free of any malicious rules. For example, blacklist 216 of filter 212 ensures that the modified action involves only elements that are not explicitly prohibited by multi-user system 100.

Figure 5:
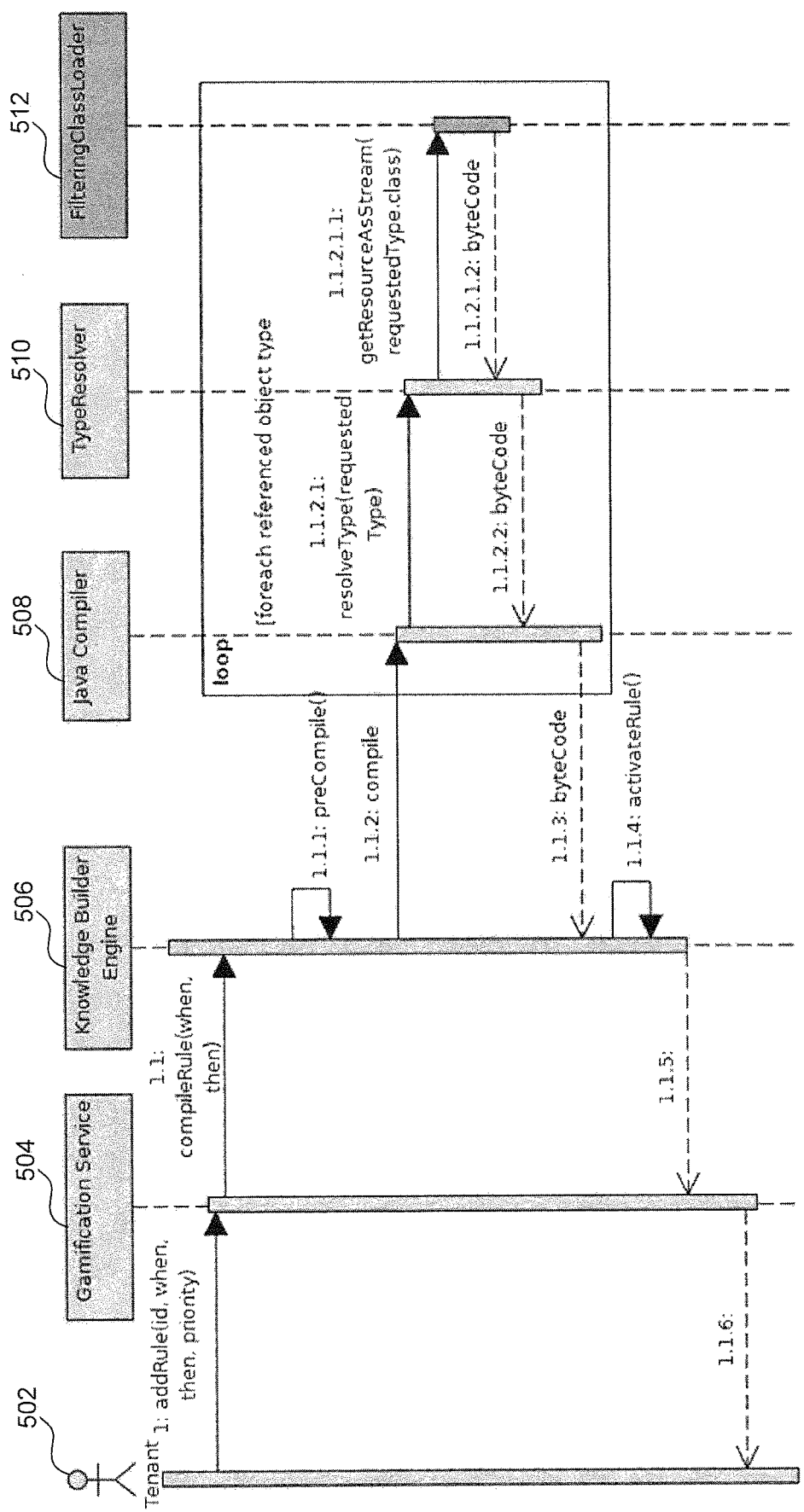
FIG. 5 is an example event diagram illustrating a process for dynamically loading user-defined code, according to some embodiments.

FIG. 5 is an example event diagram illustrating a process for dynamically loading user-defined code, according to some embodiments. Although the process of this embodiment is specific to a gamification service 504 running at a multi-tenant system in the cloud computing environment that supports Java language, it is to be appreciated that dynamic user-defined code loading process can be implemented at any multi-user system supporting any programming languages as being described above.

At 1, a tenant 502 injects a user-defined rule to gamification service 504 by user-defined code "addRule(id, when, then, priority)". At 1.1, gamification service 504 sends a request "compileRule(when, then)" to a knowledge builder engine 506 for compiling the user-defined rule. At 1.1.1, knowledge builder engine 506 pre-processes the user-defined code of the user-defined rule. At 1.1.2, knowledge builder engine 506 sends a request to a Java compiler 508 for compiling the user-defined code of the user-defined rule.

Java compiler 508 identifies each referenced object type in the user-defined code and for each referenced object type, sends a request to a type resolver 510 for resolving the requested type at 1.1.2.1. At 1.1.2.1.1, type resolver 510 loads getResource function "getResourceAsStream(requestedType.class)" into a filtering class loader 512 so that filtering class loader 512 can modify the referenced class based on a blacklist and/or a whitelist as described above. At 1.1.2.1.2 and 1.1.2.2, the compiled Java byte code of the modified class is returned by filtering class loader 512 to type resolver 510 and Java compiler 508, respectively.

Once each referenced class in the user-defined source code has been checked, modified, and compiled into byte code, Java compiler 508 returns the byte code of the user-defined code at 1.1.3 to knowledge builder engine 506. At 1.1.4, knowledge builder engine 506 activates the user-defined rule by loading the byte code. The user-defined rule is then ready to be invoked by gamification service 504 as part of its functions. Any malicious rule may be filtered out by type resolver 510 in conjunction with filtering class loader 512 based on blacklist and whitelist.

Figure 6:
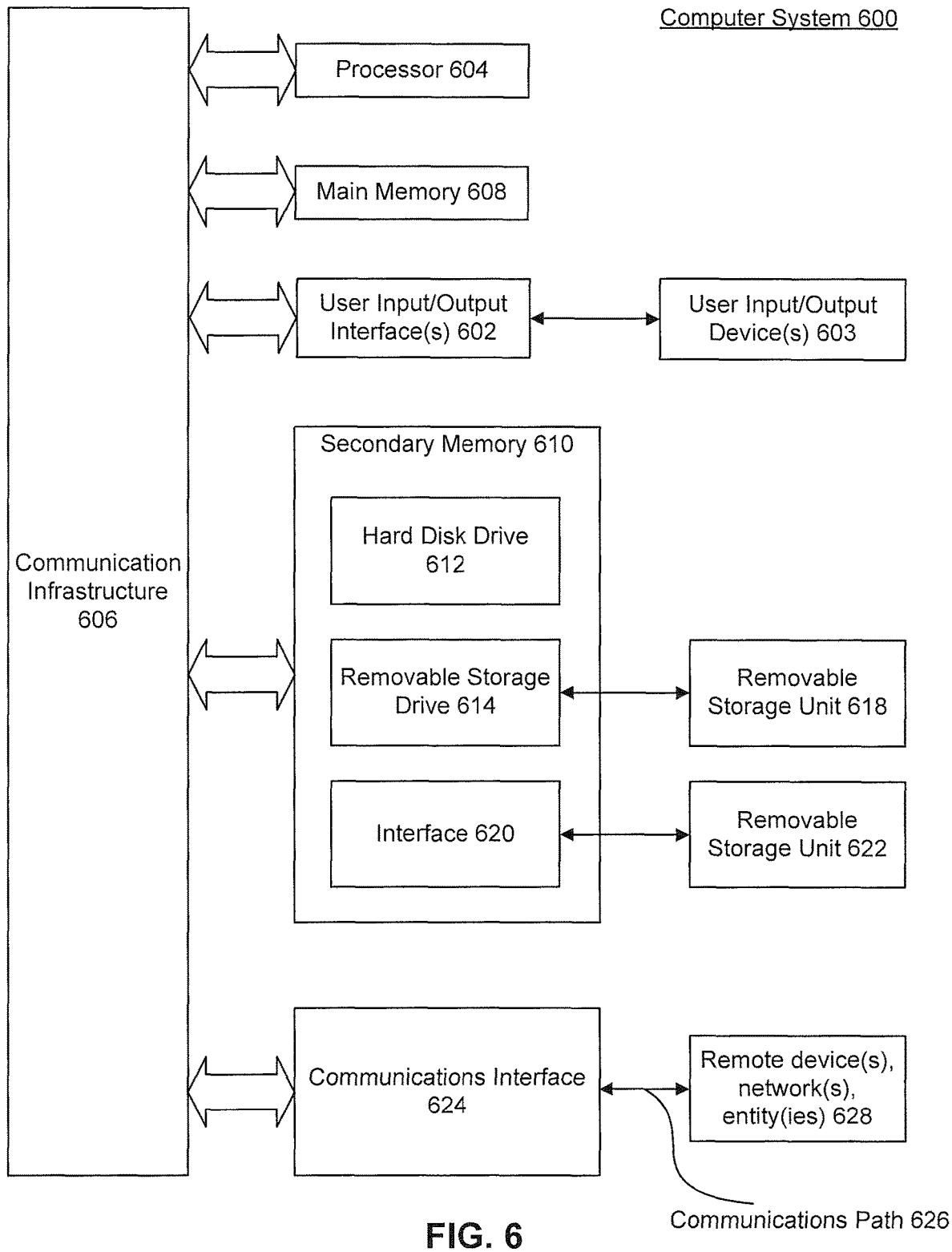
FIG. 6 is an example computer system useful for implementing various embodiments.

Various embodiments can be implemented, for example, using one or more computer systems, such as computer system 600 shown in FIG. 6. One or more computer system 600 can be used, for example, to implement method 300 of FIG. 3 and method 400 of FIG. 4, as well as event diagram of FIG. 5. For example, computer system 600 can modify an action, which is represented by source code including elements of a programming language from a user of a multi-user system, based on a filter including at least one of the elements when compiling the source code so that the compiled code represents the modified action, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the present disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the present disclosure should not be limited by any of the above-described exemplary embodiments, but should be defined only in accordance with the following claims and their equivalents.

What is claimed is:

1. A computer implemented method, comprising:
receiving, by at least one processor, an action represented by source code including one or more elements and a first element of a programming language from a user of a multi-user system, wherein the user is associated with a privilege level and a second user of the multi-user system is associated with a second privilege level;
compiling, by the at least one processor, the source code, the compiling further comprising:
selecting, based on the privilege level, a pre-defined list of unauthorized elements, wherein the second privilege level is associated with a second pre-defined list of unauthorized elements, wherein a number of unauthorized elements in the pre-defined list of unauthorized elements is different from a second number of unauthorized elements in the second pre-defined list of unauthorized elements, and wherein the number of unauthorized elements in the pre-defined list of unauthorized elements is based on the privilege level;
comparing the one or more elements and the first element to the pre-defined list of unauthorized elements;
determining that the first element matches a first unauthorized element of the pre-defined list;
removing the first element from the source code in response to the determining;
generating partial compiled code that represents a modified version of the action that includes the one or more elements and does not include the first element; and
executing, by the at least one processor, the partial compiled code on the multi-user system,
wherein at least one of the receiving, compiling, and executing are performed by one or more computers.

2. The method of claim 1, wherein the user shares a same process or resource of the multi-user system with at least another user of the multi-user system.

3. The method of claim 1, wherein the compiling further comprises:
comparing the one or more elements to a second pre-defined list of elements of the programming language that are allowable to be used.

4. The method of claim 3, the modifying further comprising:
determining that a second element of the one or more elements is in the second pre-defined list; and
in response to the determining, retaining the second element in the compiled code.

5. The method of claim 1, the compiling further comprising:
in response to the removing, selecting a subsequent element of the one or more elements; and
comparing the subsequent element to the pre-defined list.

6. The method of claim 1, wherein the one or more elements are at a plurality levels of a hierarchy.

7. The method of claim 1, wherein the number of unauthorized elements in the pre-defined list of unauthorized elements is greater than mom the second number of unauthorized elements in the second pre-defined list of unauthorized elements.

8. The method of claim 1, wherein the pre-defined list is dynamically updated in response to an event occurring in the multi-user system.

9. The method of claim 1, wherein the action is part of a user-defined rule including at least one of an event and a condition.

10. A multi-user system, comprising:
a memory; and
at least one processor coupled to the memory and configured to:
receive an action represented by source code including one or more elements and a first element of a programming language from a user of the multi-user system, wherein the user is associated with a privilege level and a second user of the multi-user system is associated with a second privilege level;
compiling, by the at least one processor, the source code, the compiling further comprising:
compile the source code into partial compiled code; and
execute the partial compiled code on the multi-user system,
wherein to compile the source code into the partial compiled code, the at least one processor is configured to:
select, based on the privilege level, a pre-defined list of unauthorized elements, wherein the second privilege level is associated with a second pre-defined list of unauthorized elements, and wherein a number of unauthorized elements in the pre-defined list of unauthorized elements is different from a second number of unauthorized elements in the second pre-defined list of unauthorized elements, and wherein the number of unauthorized elements in the pre-defined list of unauthorized elements is based on the privilege level;
compare the one or more elements and the first element to the pre-defined list of unauthorized elements;
determine that the first element matches a first unauthorized element of the pre-defined list; and
remove the first element from the source code in response to the determining; and
generating the partial compiled code that represents a modified version of the action that includes the one or more elements and does not include the first element.

11. The multi-user system of claim 10, wherein the user shares a same process or resource of the multi-user system with at least another user of the multi-user system.

12. The multi-user system of claim 10, wherein the compiling further comprises:
comparing the one or more elements to a second pre-defined list of elements of the programming language that are allowable to be used.

13. The multi-user system of claim 12, wherein to compile the source code into the compiled code, the at least one processor is configured to:
determine that a second element of the one or more elements is in the second pre-defined list; and
in response to the determining, retain the second element in the compiled code.

14. The multi-user system of claim 10, wherein to compile the source code into the compiled code, the at least one processor is further configured to:
in response to the removing, select a subsequent element of the one or more elements; and
compare the subsequent element to the pre-defined list.

15. The multi-user system of claim 10, wherein the one or more elements are at a plurality levels of a hierarchy.

16. The multi-user system of claim 10, wherein the pre-defined list of unauthorized elements includes more unauthorized elements than the second pre-defined list of unauthorized elements.

17. The multi-user system of claim 10, wherein the pre-defined list is dynamically updated in response to an event occurring in the multi-user system.

18. The multi-user system of claim 10, wherein the action is part of a user-defined rule including at least one of an event and a condition.

19. A non-transitory tangible computer-readable device having instructions stored thereon that, when executed by at least one computing device, causes the at least one computing device to perform operations comprising:
receiving an action represented by source code including one or more elements and a first element of a programming language from a user of a multi-user system, wherein the user is associated with a privilege level and a second user of the multi-user system is associated with a second privilege level;
compiling the source code, the compiling further comprising:
selecting, based on the privilege level, a pre-defined list of unauthorized elements, wherein the second privilege level is associated with a second pre-defined list of unauthorized elements, and wherein a number of unauthorized elements in the pre-defined list of unauthorized elements is different from a second number of unauthorized elements in the second pre-defined list of unauthorized elements, and wherein the number of unauthorized elements in the pre-defined list of unauthorized elements is based on the privilege level;
comparing the one or more elements and the first element to the pre-defined list of unauthorized elements;
determining that the first element of the one or more elements matches a first unauthorized element of the pre-defined list;
removing the first element from the source code in response to the determining;
generating partial compiled code that represents a modified version of the action that includes the one or more elements and does not include the first element; and
executing the partial compiled code on the multi-user system.

20. The non-transitory tangible computer-readable device of claim 19, wherein the user shares a same process or resource of the multi-user system with at least another user of the multi-user system.

21. The non-transitory tangible computer-readable device of claim 19, wherein the first element is a member within a class element, the removing further comprises removing the first element from the class element, and the executing further comprises executing the class element.

22. The method of claim 1, wherein the first element is a class element and comprises a plurality of members, and the determining further comprising:
   determining that the plurality of members are identified by the first unauthorized element of the pre-defined list.

\* \* \* \* \*